Feb. 2, 1943.   L. G. HAASE   2,309,765
SET SCREW SPOTTER
Filed May 6, 1940
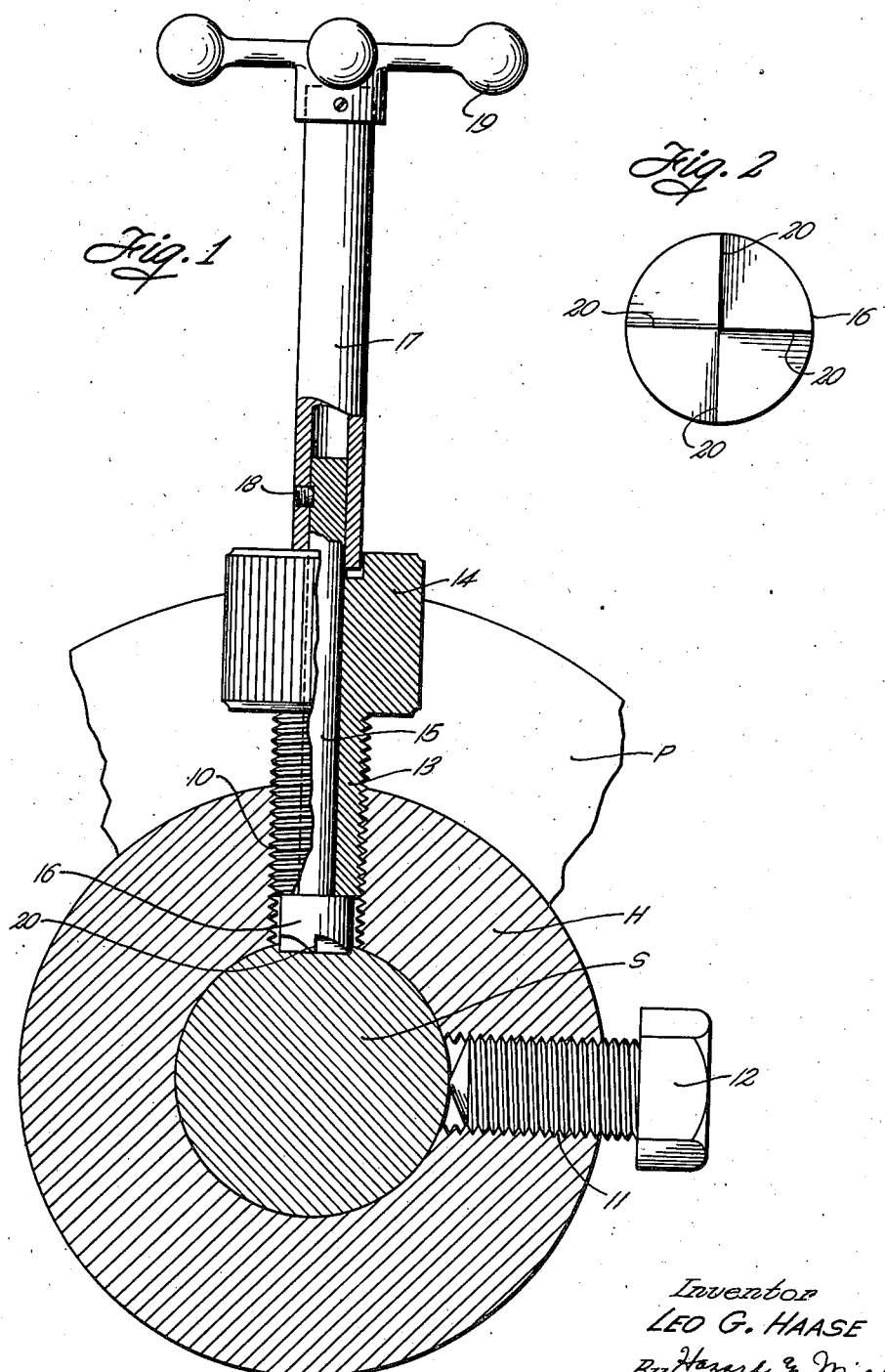
Inventor
LEO G. HAASE
By Hazard & Miller
Attorneys Patented Feb. 2, 1943

2,309,765

UNITED STATES PATENT OFFICE 2,309,765

SETSCREW SPOTTER

Leo G. Haase, Hollywood, Calif.

Application May 6, 1940, Serial No. 333,591

2 Claims. (Cl. 90—12)

This invention relates to a device designed to obviate the use of expensive key seating equipment in fastening pulleys, sprockets, gears, cams, levers, cranks, and the like on shafts.

There are many types of devices of the character above mentioned that are now normally fastened on shafts against either turning or sliding thereon by means of one or more set screws. Usually the pulley, sprocket, or gear, as the case may be, has a drilled or tapped hole therein designed to receive the set screw which is tightened against the cylindrical surface of the shaft. The effectiveness of this means of fastening depends largely upon the ability to tighten the set screw against the shaft with sufficient force to frictionally hold the pulley, sprocket, or gear, or other device against rotation and against sliding and to maintain the set screw in this tightened condition. Where a set screw is incapable of carrying the required load it has been customary to resort to cutting keyways in the shaft and in the pulley or other device and to insert keys. This involves the use of expensive key seating equipment and when this is available and the key seats are cut, some provision must then be made for locking the keys in place.

The present invention is not intended to completely eliminate the use of keys and key seating equipment inasmuch as the present invention does not purport to provide a means for so seating the set screw that extremely heavy loads can be carried thereby. The purpose of the present invention is to provide a device which will enable a seat or support to be readily cut on the shaft which will enable the set screw to be so seated that it will be capable of locking the pulley, sprocket, gear, lever, cam, crank, or other device thereon in such a manner as to be capable of carrying reasonably heavy loads without slipping and loads that are heavier than those capable of being carried by set screws that are merely tightened against the cylindrical surface of the shaft.

More specifically, an object of the invention is to provide a device which is of simple and durable construction and which can be easily and quickly used to spot a shaft to provide a seat for a set screw.

With the foregoing and other objects in view, which will be made manifest in the following detailed description and specifically pointed out in the appended claims, reference is had to the accompanying drawing for an illustrative embodiment of the invention, wherein:

Figure 1 is a sectional view through a shaft and through the hub of a portion of a pulley shown thereon illustrating the set screw spotter in applied position, the set screw spotter being shown in side elevation, parts being broken away and shown in vertical section; and Fig. 2 is a bottom plan view of the rotary cutting means that forms a part of the set screw spotter.

Referring to the accompanying drawing wherein similar reference characters designate similar parts throughout, S indicates a shaft on which it is desired to rigidly fasten some other piece of equipment such as for example, a pulley P having a hub H. It will be understood that the present device may be utilized in fastening any piece of mechanism to a shaft and that the pulley P is merely illustrative. When it is desired to fasten the pulley P to the shaft S by means of set screws the pulley is first clamped or otherwise rigidly held on the shaft. If the hub is equipped with two drilled and tapped holes indicated at 10 and 11, respectively, a set screw 12 may be screwed into one of these holes against the shaft to temporarily hold the pulley in such rigid position during the time that the set screw spotter is being used. If the hub H is not equipped with two holes a clamp or other holding means may be resorted to.

The set screw spotter comprises a hollow threaded standard or tubular member 13 which is externally threaded with threads complementary to the threads in hole 10. The top of this standard or tubular member is enlarged to provide a handle 14 the exterior of which may be vertically ribbed or knurled to facilitate screwing this member into hole 10. A stem 15 of a cutting device extends longitudinally through the tubular standard 13 and has on its lower end a cutting head 16 which is shouldered against the bottom of the standard or threaded member 13. The top of the stem 15 may have a tubular extension 17 detachably fastened thereto such as by a set screw 18 and the top of this extension is equipped with a detachable handle 19. The extension 17 is designed to be taken off and replaced by other extensions of varying lengths so that the device can be adjusted to accommodate itself to varying conditions of use.

Usually the threads in hole 10 are right hand threads, in which case the threads on the threaded member 13 are also right hand threads. The teeth or cutting edges 20 are consequently so formed as to require rotation of the cutting element in the opposite direction in order to cut from the direction in which the threaded member 13 is rotated to screw it into the hole 10. Thus, with right hand threads being employed requiring that the threaded member be screwed into hole 10 by rotating it in a clockwise direction the cutting edges 20 are so formed as to require rotation of the cutter in a counter-clockwise direction in cutting. If, for any reason, the threads in hole 10 and on the threaded member were left hand threads the cutting edges on the cutter would be oppositely formed so as to require its rotation in a right hand direction.

The teeth or cutting edges 20 on the cutting head 16 form a type of end mill capable of cutting a circular area on the shaft S when rotated to accommodate the end of the set screw.

When it is desired to spot the shaft S for the set screw the threaded member is screwed into the hole by turning its handle between the thumb and fingers of the left hand. It is advanced until the cutting edges 20 are brought into contact with the shaft. The cutter is then rotated by means of handle 19 by the right hand and as cutting progresses, the threaded member is continually but gradually advanced. In this way, a flattened area or slight depression is cut on the surface of the shaft. During the cutting inasmuch as the amount of metal cut is very small it is unnecessary to make any special provision for the cuttings. Usually the clearance space behind the cutting edges 20 will adequately take care of cuttings or chips produced in making a complete cut on the shaft to spot the set screw.

When the cut is completed the device is removed by backing out the threaded member 13 and a set screw may then be screwed into hole 10 and tightened against the flat or depression formed on shaft S. Where there are two holes present, such as holes 10 and 11, the setting of the set screw in hole 10 may suffice to hold the pulley in place while a similar spot is being cut on the shaft opposite hole 11.

Set screws set in holes against spots thus formed on the shaft are capable of firmly fastening the pulley or any equivalent device on the shaft both against rotation and against sliding. Such set screws tightened against the spotted shaft are capable of transmitting much heavier loads than set screws merely tightened against the cylindrical surface of the shaft. At the same time the use of expensive key seating equipment, the use of keys and key fastening devices is entirely avoided. While there are numerous situations wherein the loads to be transmitted are so heavy as to require the use of keys the present device may be advantageously employed where it is desired to transmit loads that are incapable of being transmitted by the ordinary set screw tightened against the cylindrical surface or unspotted surface of the shaft S.

Various changes may be made in the details of construction without departing from the spirit or scope of the invention as defined by the appended claims.

I claim:

1. A device of the class described, comprising a hollow threaded member adapted to be screwed into a threaded hole designed to receive a set screw, and a rotary cutting tool having a stem by which it may be rotated extending through the threaded member, said cutting tool having a head abutting the end of the threaded member and presenting cutting edges, the cutting edges of the cutting tool being so directed as to require its rotation in cutting in a direction opposite to the direction of rotation of the threaded member in screwing it into the set screw hole.

2. A device of the class described, comprising a hollow threaded member adapted to be screwed into a threaded hole designed to receive a set screw, a rotary cutting tool having a stem by which it may be rotated extending through the threaded member, said cutting tool having a head abutting against the end of the hollow threaded member and which is of smaller diameter than the threaded member, said cutting tool presenting cutting edges designed to cut a circular area to provide a seat for the set screw.

LEO G. HAASE.